United States Patent
Dai et al.

(10) Patent No.: US 10,897,530 B2
(45) Date of Patent: Jan. 19, 2021

(54) INPUT METHOD, DEVICE AND SYSTEM

(71) Applicant: GOERTEK INC., Weifang (CN)

(72) Inventors: Tianrong Dai, Weifang (CN); Yuge Zhu, Weifang (CN); Dachuan Zhao, Weifang (CN); Xiang Chen, Weifang (CN)

(73) Assignee: Goertek Inc., Shandong (CN)

(*) Notice: Subject to any disclaimer, the term of this patent is extended or adjusted under 35 U.S.C. 154(b) by 148 days.

(21) Appl. No.: 15/775,053

(22) PCT Filed: Nov. 15, 2017

(86) PCT No.: PCT/CN2017/111068
§ 371 (c)(1),
(2) Date: Dec. 13, 2018

(87) PCT Pub. No.: WO2018/223605
PCT Pub. Date: Dec. 13, 2018

(65) Prior Publication Data
US 2019/0335034 A1 Oct. 31, 2019

(30) Foreign Application Priority Data
Jun. 6, 2017 (CN) .......................... 2017 1 0419632

(51) Int. Cl.
*H04M 1/725* (2006.01)
*G06F 3/01* (2006.01)
(Continued)

(52) U.S. Cl.
CPC ........ *H04M 1/72533* (2013.01); *G06F 3/016* (2013.01); *H04M 1/7253* (2013.01);
(Continued)

(58) Field of Classification Search
CPC ............ G06F 3/011; A63F 2300/8082; A61B 2090/365; G05B 2219/00671; G06K 9/00671; B60K 2370/177
See application file for complete search history.

(56) References Cited

U.S. PATENT DOCUMENTS

2012/0032877 A1* 2/2012 Watkins, Jr. .......... G06F 1/1624
345/156
2013/0265241 A1* 10/2013 Thorn ..................... G06F 3/013
345/173
(Continued)

FOREIGN PATENT DOCUMENTS

| CN | 105988583 A | 10/2016 |
|---|---|---|
| CN | 106095235 | 11/2016 |

(Continued)

OTHER PUBLICATIONS

International Search Report (PCT/ISA/210) dated Mar. 12, 2018, by the Chinese Patent Office as the International Searching Authority for International Application No. PCT/CN2017/111068.
(Continued)

*Primary Examiner* — Kenneth Bukowski
(74) *Attorney, Agent, or Firm* — Buchanan Ingersoll & Rooney PC

(57) ABSTRACT

An input method, device and system applied to a mobile smart terminal. The method includes: establishing communication connection with a virtual reality device; collecting input information of a user on the mobile smart terminal; and generating a corresponding operating instruction according to the input information and a corresponding matching relationship between preset instruction and input information in a preset instruction database, and sending the generated operating instruction to the virtual reality device, to enable the virtual reality device to execute a corresponding operation according to the operating instruction. An input (Continued)

device and an input system corresponding to the method are also provided. According to the input method, device and system, a corresponding operating instruction is generated by using the user input signal received on the mobile smart terminal to control the virtual reality device, thereby avoiding purchasing a gamepad, saving users money, facilitating the use, and improving the user experience.

17 Claims, 2 Drawing Sheets

(51) Int. Cl.
*G06F 3/0346* (2013.01)
*G06F 3/0484* (2013.01)
*G06F 3/0488* (2013.01)

(52) U.S. Cl.
CPC .......... *G06F 3/0346* (2013.01); *G06F 3/0488* (2013.01); *G06F 3/04842* (2013.01); *H04M 2250/02* (2013.01); *H04M 2250/06* (2013.01); *H04M 2250/12* (2013.01)

(56) References Cited

U.S. PATENT DOCUMENTS

| | | | |
|---|---|---|---|
| 2015/0279110 A1* | 10/2015 | Kimura | G06F 3/012 345/633 |
| 2016/0299563 A1 | 10/2016 | Stafford et al. | |
| 2016/0350972 A1* | 12/2016 | Kauffmann | G06T 19/006 |

FOREIGN PATENT DOCUMENTS

| | | |
|---|---|---|
| CN | 106598213 A | 4/2017 |
| CN | 106708412 | 5/2017 |
| CN | 107291359 A | 10/2017 |
| JP | 2005-148844 | 6/2005 |

OTHER PUBLICATIONS

Written Opinion (PCT/ISA/237) dated Mar. 12, 2018, by the Chinese Patent Office as the International Searching Authority for International Application No. PCT/CN2017/111068.
First Office Action issued in corresponding Chinese Patent Application No. 201710419632.5, dated Jun. 3, 2019 (21 pages) and translation.
Search Report issued in corresponding Chinese Patent Application No. 201710419632.5, dated Jun. 3, 2019 (2 pages).

* cited by examiner

INPUT METHOD, DEVICE AND SYSTEM

CROSS REFERENCE TO RELATED APPLICATIONS

This application is a U.S. National Stage entry of International Application No. PCT/CN2017/111068, filed on Nov. 15, 2017, which claims priority to Chinese Patent Application No. 201710419632.5, filed on Jun. 6, 2017. The entire contents of each of which are incorporated herein by reference.

TECHNICAL FIELD

The application pertains to the technical field of virtual reality devices, and particularly relates to an input method, device and system.

BACKGROUND

With the development of science and technology, various kinds of virtual reality devices such as head-mounted virtual reality headpieces and virtual reality glasses have appeared on the market in recent years. By using a virtual reality device, a user can be immersed in a three-dimensional dynamic simulated environment, which provides a better user experience. For example, when a user plays a 3D game by using a virtual reality device, the virtual reality device does not only ensure the real-timeness and interactiveness of the game, but also improves the fidelity and immersion of the game scenes.

However, presently, most virtual reality devices conduct input by using a dedicated gamepad which has its limitations. For example, dedicated gamepads have a relatively small volume, so the number of physical buttons that can be provided on the dedicated gamepads is small, and thus the functions that can be realized are limited. In addition, cables are needed to connect some kinds of dedicated gamepads to the virtual reality devices, which results in inconvenient movement in use. Furthermore, as a dedicated gamepad is relatively expensive, if a users must buy a dedicated gamepad after buying a virtual reality device, it will increase the economic burden of the user.

SUMMARY

The application provides an input method, device and system, to solve the problems of limited input functions, inconvenient movement, poor user experience and high costs when a dedicated gamepad is used as an input device in a virtual reality device in the prior art.

According to an aspect of the application, there is provided an input method, applied to a mobile smart terminal, comprising:

establishing communication connection with a virtual reality device;

collecting input information of a user on the mobile smart terminal in an input mode; and generating a corresponding operating instruction according to the input information and a corresponding matching relationship between preset instruction and input information in a preset instruction database, and sending the operating instruction to the virtual reality device, to cause the virtual reality device to execute a corresponding operation according to the operating instruction.

According to another aspect of the application, there is provided an input device, applied to a mobile smart terminal, comprising: a processor, and a communication module and an input collection module which are connected to the processor, wherein the communication module establishes communication connection with a virtual reality device, and sends the operating instruction to the virtual reality device, to cause the virtual reality device to execute a corresponding operation according to the operating instruction;

the input collection module collects input information of a user on the mobile smart terminal in an input mode; and the processor generates a corresponding operating instruction according to the input information and a corresponding matching relationship between preset instruction and input information in a preset instruction database.

According to still another aspect of the application, there is provided an input system, comprising: a mobile smart terminal, and a virtual reality device which establishes communication connection with the mobile smart terminal, wherein the mobile smart terminal collects input information inputted by a user, generates a corresponding operating instruction according to the input information and a corresponding matching relationship between preset instruction;

input information in a preset instruction database, and sends the generated operating instruction to the virtual reality device; and the virtual reality device receives an operating instruction and executes a corresponding operation according to the operating instruction.

The advantageous effects of the application are as follows. According to the input method, device and system of the embodiments of the application, by establishing connection with the virtual reality device by using the mobile smart terminal, and receiving the input information inputted by the user on the mobile smart terminal, the operating instruction generated based on the input information is sent to the virtual reality device, to cause the virtual reality device to execute a corresponding operation according to the operating instruction. Thus, the application provides a solution in which a mobile smart terminal that the user has already had is used to realize the input on the virtual reality device. As the user can conveniently input various kinds of information into the mobile smart terminal, the input functions of the virtual reality device are enriched, and the problem that the small volume of dedicated gamepads restricts the input function can be solved, thereby the demands of the user are satisfied without purchasing a separate dedicated gamepad, which saves users money and facilitates popularization and application on a large scale.

DETAILED DESCRIPTION

The invention concept of the application is as follows. With respect to the problem in the prior art that most virtual reality devices use dedicated gamepads to input, the application proposes a technical solution in which a mobile smart terminal is used as an input device of a virtual reality device, specifically, by establishing connection between the mobile smart terminal and the virtual reality device, receiving the input information inputted by the user on the mobile smart terminal, and sending the input information or an operating instruction generated according to the input information is sent to the virtual reality device, to enable the virtual reality device execute operations according to the input information or the operating instruction, thereby avoiding the problems caused by using dedicated gamepads and improving the user experience.

Figure 1:
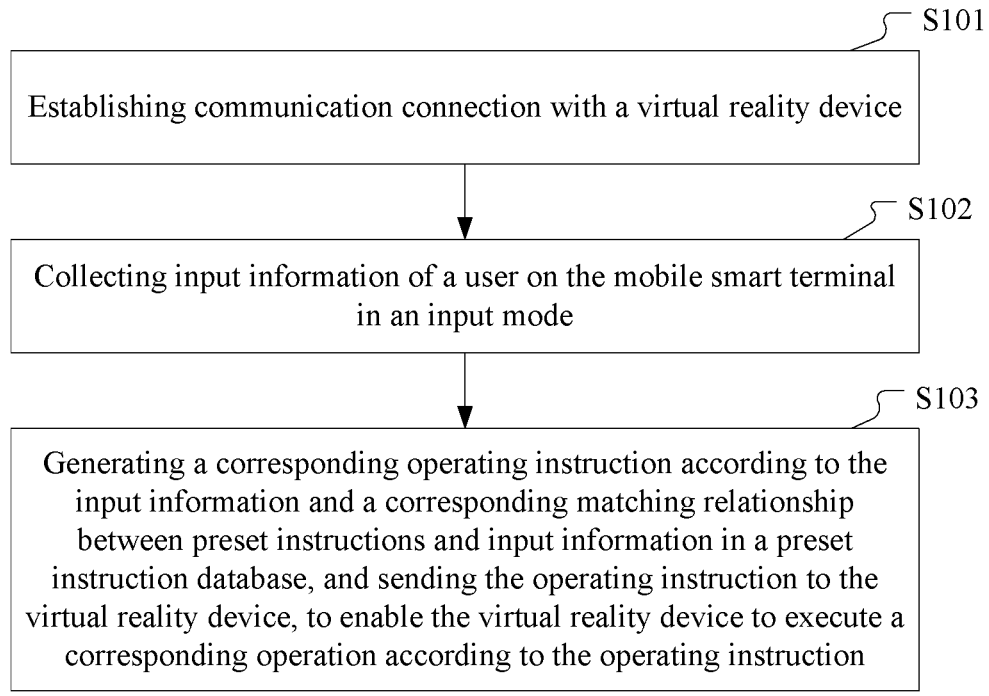
FIG. 1 is a schematic flow diagram of an input method in accordance with some embodiments of the application.

FIG. 1 is a schematic flow diagram of an input method in accordance with some embodiments of the application. Referring to FIG. 1, the input method of the present embodiment, applied to a mobile smart terminal, comprises the following steps:

Step S101, establishing communication connection with a virtual reality device;

Step S102, collecting input information of a user on the mobile smart terminal in an input mode; and Step S103, generating a corresponding operating instruction according to the input information and a corresponding matching relationship between preset instruction and input information in a preset instruction database, and sending the operating instruction to the virtual reality device, to enable the virtual reality device to execute a corresponding operation according to the operating instruction.

It can be known from FIG. 1 that, the method of the present embodiment establishes connection with the virtual reality device by using the mobile smart terminal (such as a smart phone), collects the input information of the user on the mobile smart terminal after entering the input mode, generates an operating instruction according to the input information and a corresponding matching relationship between preset instruction and input information in a preset instruction database, and sends the operating instruction to the virtual reality device, to enable the virtual reality device to execute a corresponding operation according to the operating instruction. Accordingly, the method does not need to purchase a dedicated gamepad and saves users money. In addition, the method can conduct various forms of input on the mobile smart terminal, which facilitates the user's control over the virtual reality device, realizes the control over various functions of the virtual reality device, optimizes the user experience, and satisfies the user's demands.

It should be noted that, the implementing of the present embodiment is based on the mobile smart terminal, particularly, based on the hardware of the mobile smart terminal and an input controlling application program installed in the mobile smart terminal. The input operation to the virtual reality device is completed by the cooperation of the hardware and the input controlling application program.

The implementing steps of the input method of the present embodiment are described in further detail below.

In order to realize the input control operation to the virtual reality device, the mobile smart terminal to which the input method of the present application is applied must establish connection with the virtual reality device first. In some embodiments of the application, the connection established between the mobile smart terminal and the virtual reality device may be wired connection or wireless connection.

Preferably, according to acquired connection state information of the virtual reality device, the mobile smart terminal establishes Bluetooth wireless communication connection or Wi-Fi wireless communication connection with the virtual reality device. By establishing wireless connection and conducting data transmission, the constraint of cables can be eliminated, and freer movement can be achieved when the virtual reality device and the mobile smart terminal are being used, which improves the degree of user satisfaction.

In the present embodiment, when the connection is being established, the mobile smart terminal first acquires the connection state information of the virtual reality device, and the connection state information herein refers to information regarding whether the virtual reality device is in connectable state. Generally, in consideration of power saving, the virtual reality device is generally in the standby state when not being used, and at this point the communication function of the virtual reality device may probably be unusable. If the connection with the virtual reality device is intended to be established, the communication function of the virtual reality device must be awakened first; namely, the virtual reality device must be in the connection state and usable. Here, the description is made by taking the example of establishing Bluetooth wireless communication connection. First, after the virtual reality device is started up, the Bluetooth function of the virtual reality device is turned on; subsequently, the mobile smart terminal searches for neighboring Bluetooth signals, and acquires that the connection state information of the virtual reality device is the information of turning on the Bluetooth state; then, authentication between the Bluetooth module of the mobile smart terminal and the Bluetooth module of the virtual reality device is conducted; if the authentication is passed, the Bluetooth connection with the virtual reality device can be successfully established.

After the Bluetooth wireless communication connection with the virtual reality device is successfully established, the mobile smart terminal enters the input mode of the virtual reality device according to the selecting instruction of the user or automatically, and receives the input information of the user.

In some embodiments of the application, the mobile smart terminal is installed therein with an input controlling application program, and when the user selects to enter the input mode of the virtual reality device, the input controlling application program notifies the display screen or attitude sensor of the mobile smart terminal to receive the input information inputted by the user.

Particularly, the step of collecting input information of a user on the mobile smart terminal comprises the step of: collecting first input information inputted by the user on a touch screen of the mobile smart terminal, and/or, collecting second input information inputted by the user by changing a movement attitude of the mobile smart terminal.

Namely, the input information of the present embodiment may be first input information inputted by the user collected on a touch screen of the mobile smart terminal, or, may be second input information inputted by the user by changing a movement attitude of the mobile smart terminal, or, may be first input information inputted by the user that is collected on a touch screen of the mobile smart terminal and second input information inputted by the user by changing a movement attitude of the mobile smart terminal.

Thus, the operating instruction may be generated according to the input information collected on the touch screen of the mobile smart terminal, or the input information obtained according to the changing of movement attitude of the mobile smart terminal, and thus the control over the virtual reality device is completed, which enriches the control functions of the virtual reality device and satisfies the demands of different applications.

In some embodiments of the application, when the second input information has been collected, the input method of the present embodiment further comprises the step of: sending the second input information to the virtual reality device, to enable the virtual reality device to execute a corresponding operation according to the second input information. Thus, the input information inputted by the user on the mobile smart terminal can be directly sent to the virtual reality device without generating a corresponding operating instruction, to enable the virtual reality device to execute operations according to the input information, which improves the user experience.

In some embodiments of the application, the step of collecting first input information inputted by the user on a touch screen of the mobile smart terminal comprises the step of: collecting first input information inputted by the user by clicking a virtual button displayed on the touch screen and/or inputting a hand gesture on the touch screen; the preset instruction database includes: upward, downward, leftward and rightward moving instructions; a confirmation instruction and a cancellation instruction; and a display area zoom in instruction and a display area zoom out instruction.

Particularly, the first input information refers to the input information of the user collected by using the touch screen. For example, the first input information may be the information inputted by the user by clicking a virtual button displayed on the touch screen; the virtual button may be a virtual button that indicates a direction, such as the virtual buttons corresponding to upward, downward, leftward and rightward directions. When the user clicks the virtual button "upward" displayed on the touch screen, the device looks up the preset instruction that matches the virtual button "upward" according to the preset instruction in the preset instruction database, generates an operating instruction according to the preset instruction found, namely, generates an operating instruction that controls the object to move upwardly, and then sends the generated operating instruction to the virtual reality device via the Bluetooth wireless communication connection or Wi-Fi wireless communication connection established as stated above, to enable the virtual reality device to execute the operation of moving the object (such as a certain person in a 3D game running on the virtual reality device) upwardly according to the operating instruction.

In addition, the preset instruction may also be a confirmation instruction indicating a confirming operation and a cancellation instruction indicating a cancelling operation. In the method of the present embodiment, the information inputted by the user by clicking a confirmation virtual button or a cancellation virtual button displayed on the touch screen is received, the preset instruction that matches the confirmation virtual button or the cancellation virtual button is looked up according to the preset instruction in the preset instruction database, a corresponding operating instruction is generated according to the found preset instruction and sent to the virtual reality device, thereby controlling the virtual reality device to execute the corresponding operation.

The above describes collecting the input information inputted by the user by clicking the touch screen. In practical applications, the step of collecting first input information inputted by the user on a touch screen of the mobile smart terminal may also comprise the step of collecting a hand gesture inputted by the user on a touch screen. For example, in the method of the present embodiment, the touch point information of the user on the touch screen is detected; the number of touch points currently on the touch screen is judged, and when the number of touch points are two or more and the distances between the touch points are continuously increasing, it is determined that the user is currently inputting a two-finger movement hand gesture; then, the matched preset instruction in the preset instruction database is looked up according to the input information of the two-finger movement hand gesture, for example, a two-finger movement preset instruction is matched; an operating instruction of magnifying the displaying area is generated according to the two-finger movement preset instruction and sent to the virtual reality device. Thus, the method facilitates the user completing the information input operation to the virtual reality device by inputting the hand gesture on the touch screen of the mobile smart terminal, which satisfies the user's demands.

In some embodiments of the application, the step of collecting second input information inputted by the user by changing a movement attitude of the mobile smart terminal comprises the steps of: collecting current movement data of the mobile smart terminal; determining current movement attitude information of the mobile terminal according to the movement data; and using the current movement attitude information of the mobile terminal as the second input information. Particularly, the sensor data are collected by using a nine-axis sensor (namely, a nine-axis sensor formed by a three-axis acceleration sensor, a three-axis gyroscope and a three-axis electronic compass) on the mobile smart terminal and calculated to obtain the current attitude information of the mobile smart terminal as the second input information; the attitude information is obtained based on linear acceleration information and angular acceleration information.

The nine-axis sensor in the mobile smart terminal of the present embodiment is in fact a combination of three sensors, namely, a three-axis acceleration sensor, a three-axis gyroscope and a three-axis electronic compass (or referred to as a geomagnetic field sensor). The three sensors have different functions and cooperate with each other to realize movement sensing and tracking. Among them, the acceleration sensor is used for measuring the accelerations in the directions in space. The acceleration sensor collects the pressure generated in movement, and then converts the pressure to an electrical signal. As the movement changes, the pressure in different directions is different, and the electrical signal also varies, so the direction of acceleration and the amplitude of speed of the mobile smart terminal can be determined.

The gyroscope is used for measuring the angle and maintaining the direction. The gyroscope changes the circuit state by the movement deviation of an oscillator, and causes relevant electrical parameters to change, and thus can reflect the movement attitudes of the mobile smart terminal such as left and right tilting, front and back tilting and left and right swing. By using the acceleration sensor and the gyroscope, the complete movement state of the mobile smart terminal can be basically described. However, over a long duration of movement, the acceleration sensor and the gyroscope will have accumulated deviation and cannot accurately describe the movement attitude of the mobile smart terminal, such as the tilting of the controlling images. So an electronic compass is needed to conduct correction and compensation.

The electronic compass measures the earth magnetic field and conducts correction and compensation, which can effectively remove the accumulated deviation, and therefore can be used for rectifying the movement direction, attitude angle, movement intensity, speed and so on of the mobile smart terminal. Using a nine-axis sensor can realize movement detection of high precision of the mobile smart terminal to obtain the second input information, and in turn realize the input control over the operation effects of different kinds of games in the virtual reality device.

In practical applications, when the user wants to control the virtual reality device to display a particular game scene, such as a tilted game image, the user may utilize the nine-axis sensor in the mobile smart terminal to collect and calculate the current attitude and movement information of the mobile smart terminal. Particularly, according to a preset data fusion algorithm (such as a neural network method, a fusion method based on feature extraction and a fusion method based on searching), the data that are collected individually by the acceleration sensor, gyroscope and electronic compass are fused, and calculated to obtain the current attitude information of the mobile smart terminal as the second input information. Because the second input information is mainly the movement attitude information of the mobile smart terminal such as attitude information and acceleration information, these kinds of information may be directly transferred to a head-mounted virtual reality device, and an application program (such as a 3D game application program) on the virtual reality device will particularly decides how to use these kinds of input information. In an embodiment, the second input information obtained by collecting the movement attitude of the mobile smart terminal may also be used to generate a corresponding operating instruction, according to the corresponding matching relationship between preset instruction in the preset instruction database and the second input information, and the operating instruction is sent to the virtual reality device to enable the virtual reality device to execute operations according to the operating instruction, but the application is not limited hereto.

In addition, the inventors of the present application find that, when the method of the present embodiment is used to conduct input on the virtual reality device, because the eyes of user must stare at the display screen of the virtual reality device, the user can only rely on the hand feeling to input information into the mobile smart terminal, which causes frequent input errors and affects the input effect.

Regarding this problem, the present embodiment provides two modes of feeding back the touching information on the mobile smart terminal to the user.

The first feeding back mode is, by means of the display screen of the virtual reality device, displaying on the touch screen of the mobile smart terminal the thumbnail of the currently displayed input interface and the coordinate information of the touch point inputted by the user on the input interface.

Particularly, according to the input method of the present embodiment, when it is detected that the user is touching the touch screen of the mobile smart terminal, a thumbnail of the currently displayed input interface on the touch screen is generated to obtain thumbnail information, coordinate information of a touch point inputted by the user on the touch screen is acquired, the coordinate information and the thumbnail information are sent to the virtual reality device, and the virtual reality device is enabled to display on a display screen the currently displayed input interface corresponding to the thumbnail information, and display a corresponding touch point on the thumbnail according to the coordinate information, to feed back the touching information currently on the mobile smart terminal to the user.

Thus, the method can reduce the probability of occurrence of input errors while ensuring that the eyes of user can stare at the display screen of the virtual reality device, which improves the user experience.

The second feeding back mode is conducting a corresponding vibration reminder or sound reminder on the mobile smart terminal.

Particularly, according to the input method of the present embodiment, when it is detected that the user is touching the touch screen of the mobile smart terminal, coordinate information of a touch point inputted by the user on the touch screen is acquired; one-by-one matching of the coordinate information of the touch point with preset coordinate information corresponding to the preset instruction in the preset instruction database is conducted; when the coordinate information of the touch point and preset coordinate information corresponding to the preset instruction is matched, vibration reminder information corresponding to the preset instruction is generated, and a vibration reminder is conducted on the mobile smart terminal, to feed back the touching information currently on the mobile smart terminal to the user; when the coordinate information of the touch point is matched with none of the preset coordinate information corresponding to the preset instruction in the preset instruction database, the vibration reminder will not be conducted, or a sound reminder is conducted on the mobile smart terminal, to feed back the touching information currently on the mobile smart terminal to the user.

It should be noted that, in the present embodiment, the preset instruction may be defined in the preset instruction database. For example, regarding the upward moving instruction, when the virtual button "upward" is displayed on the touch screen, the coordinate information is saved; when it is detected that the user is inputting on the touch screen, the coordinate information of the touch point is obtained by receiving the user's clicking operation on the touch screen, and the coordinate information and the preset coordinate information of the preset instruction are matched one by one. If the coordinate information of the touch point inputted by the user matches with the preset coordinate information of the upward moving instruction in the preset instruction database, it is determined that the current touching operation of the user targets the upward moving instruction, then the vibration reminder information corresponding to the upward moving instruction (such as high intensity vibration reminder information, middle intensity vibration reminder information and so on) is generated. The mobile smart terminal outputs the vibration reminder information; namely, a corresponding vibration reminder is generated in the mobile smart terminal, to enable the user to know whether the instruction is correctly inputted according to the vibration reminder.

Thus, the method can feed back the input operation of the user to the user in time while ensuring that the eyes of user can continuously stare at the display screen of the virtual reality device, which facilitates the user rectifying input errors in time, and improves the user experience.

In addition, conducting a vibration reminder and a sound reminder in the mobile smart terminal is merely illustrative here, and the application is not limited hereto. In practical applications, the method may also provide other reminder modes to feed back the touching operation information of the user on the mobile smart terminal to the user.

Figure 2:
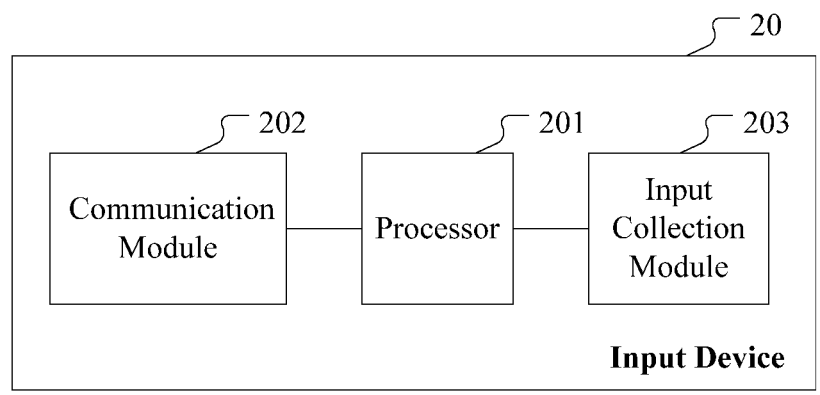
FIG. 2 is a block diagram of the structure of an input device in accordance with some embodiments of the application.

Corresponding to the input method, the embodiments of the application further provide an input device. FIG. 2 is a block diagram of the structure of an input device in accordance with some embodiments of the application. Referring to FIG. 2, the input device 20 is applied to a mobile smart terminal and comprises: a processor 201, and a communication module 202 and an input collection module 203 which are connected to the processor 201.

The communication module 202 establishes communication connection with a virtual reality device, and sends the corresponding operating instruction generated by the processor 201 to the virtual reality device, to enable the virtual reality device to execute a corresponding operation according to the operating instruction.

The input collection module 203 collects input information of a user on the mobile smart terminal and sends it to the processor in an input mode 201.

The processor 201 generates a corresponding operating instruction according to the input information and a corresponding matching relationship between preset instruction and input information in a preset instruction database.

In some embodiments of the application, the input collection module 203 comprises: a first input module and/or a second input module.

The first input module comprises a touch screen and a first control circuit connected to the touch screen, and collects first input information inputted by the user on the touch screen.

When such an input mode is used, since the four sides of the touch screen is all plated with elongated electrodes, a low voltage alternating electric field is formed within the electric conductor. When the screen is being touched, a coupling capacitor will be formed between the finger and the conductor layer under the effect of the human body electric field, and the currents generated by the four side electrodes will flow to the touch point. As the current intensity is inversely proportional to the distance from the finger to the electrode, the first control circuit calculates the proportions and intensities of the currents according to the proportion relationship, and in turn accurately calculates out the position of the touch point.

The second input module comprises an attitude sensor and a switching circuit connected to the attitude sensor, and collects an attitude of the mobile smart terminal to obtain second input information.

Particularly, the attitude sensor directly senses the measured object, and outputs a signal of a physical quantity that has a definite relationship with the measured object, and the switching circuit converts the physical quantity signal into an electrical signal, and calculates out the movement attitude of the mobile smart terminal according to the electrical signal.

In some embodiments of the application, the input collection module 203 is further for sending the second input information collected by the second input module to the communication module 202, and the communication module 202 sends the second input information to the virtual reality device, to enable the virtual reality device to execute a corresponding operation according to the second input information.

In some embodiments of the application, the attitude sensor is a nine-axis sensor, and the nine-axis sensor collects sensor data to obtain movement data, and calculates according to the movement data to obtain current attitude information of the mobile smart terminal as the second input information.

In some embodiments of the application, the first input module is particularly for collecting first input information inputted by the user by clicking a virtual button displayed on the touch screen and/or inputting a hand gesture on the touch screen. The preset instruction database includes: upward, downward, leftward and rightward direction moving instructions; a selection confirmation instruction and a selection cancellation instruction; and a display area zoom in instruction and a display area zoom out instruction.

Figure 4:
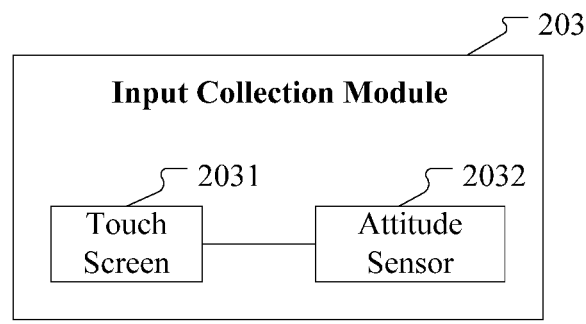
FIG. 4 is a schematic diagram of the structure of an input collection module in FIG. 3.

It should be noted that, the input collection module 203 in the present embodiment corresponds to two input hardwares of the mobile smart terminal. Referring to FIG. 4, the input collection module 203 comprises a touch screen 2031 and an attitude sensor 2032.

In some embodiments of the application, when the input collection module 203 employs the touch screen, the first control circuit connected to the touch screen calculates and obtains the coordinate of the touch point. Then the information currently inputted by the user can be determined by matching according to the coordinate of the touch point and the preset coordinate information of elements on the input interface.

In some embodiments of the application, when the input collection module 203 employs the attitude sensor such as a nine-axis sensor, the nine-axis sensor collects the current movement data of the mobile smart terminal, and determines current movement attitude information of the mobile terminal according to the movement data as the second input information. Particularly, for example, when the user is tilting the mobile smart terminal leftwardly, the nine-axis sensor collects the current movement data, determines the state information of leftward movement according to the movement data, and then uses the movement state information as the second input information.

It can be understood that, in different embodiments, the nine-axis sensor and the touch screen may be used in combination to collect the input information of the user, and the present invention is not limited to solely using the nine-axis sensor or solely using the touch screen to collect the input information of the user.

In some embodiments of the application, the first input module further comprises a first feeding back module and a second feeding back module.

The first feeding back module is for, when it is detected that the user is touching the touch screen of the mobile smart terminal, generating a thumbnail of the currently displayed input interface on the touch screen and obtain thumbnail information, acquiring coordinate information of a touch point inputted by the user on the touch screen, sending the coordinate information and the thumbnail information to the virtual reality device, and enabling the virtual reality device to display on a display screen the currently displayed input interface and the touch point corresponding to the thumbnail, to feed back the touching information currently on the mobile smart terminal to the user.

The second feeding back module is for acquiring coordinate information of a touch point inputted by the user on the touch screen; conducting one-by-one matching of the coordinate information of the touch point with preset coordinate information corresponding to the preset instruction in the preset instruction database; when preset coordinate information corresponding to the preset instruction is matched, generating vibration reminder information corresponding to the preset instruction and conducting a vibration reminder on the mobile smart terminal; when preset coordinate information corresponding to the preset instruction cannot be matched, not conducting the vibration reminder or conducting a sound reminder on the mobile smart terminal.

In the present embodiment, the communication module is particularly for, when the collected input information of the user on the mobile smart terminal is the first input information, generating a corresponding operating instruction according to the first input information and a corresponding matching relationship between preset instruction and input information in a preset instruction database, and sending the operating instruction to the virtual reality device by the Bluetooth wireless communication connection or Wi-Fi wireless communication connection; when the collected input information of the user on the mobile smart terminal is the second input information, sending the second input information to the virtual reality device by the Bluetooth wireless communication connection or Wi-Fi wireless communication connection.

It should be noted that, the working process of the input device of the present embodiment corresponds to the implementing steps of the above input method. Therefore the working process of the input device of the present embodiment may refer to the above relevant description of the application, which is not repeated here.

Figure 3:
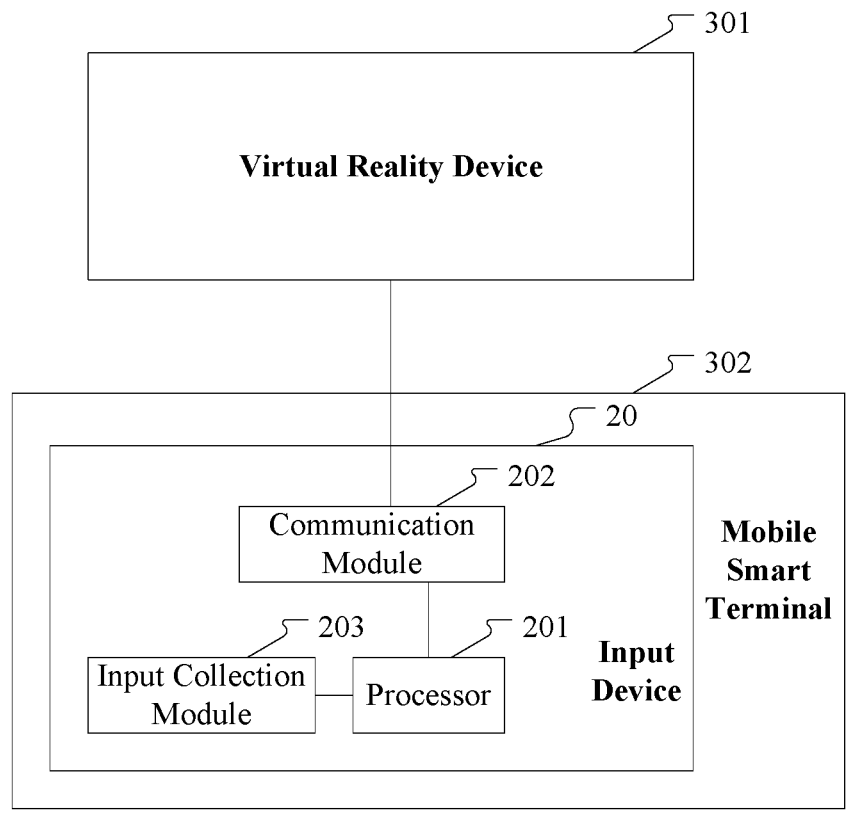
FIG. 3 is a block diagram of the structure of an input system in accordance with some embodiments of the application.

The embodiments of the application further provide an input system. FIG. 3 is a block diagram of the structure of an input system in accordance with some embodiments of the application. Referring to FIG. 3, the input system comprises: a mobile smart terminal 302, and a virtual reality device 301 which establishes communication connection with the mobile smart terminal 302.

The mobile smart terminal 302 comprises the above input device 20 of the embodiments of the application.

The input device 20 comprises: a processor 201, and a communication module 202 and an input collection module 203 which are connected to the processor 201, The mobile smart terminal 302 collects input information inputted by a user, generates a corresponding operating instruction according to the input information and a corresponding matching relationship between preset instruction and input information in a preset instruction database, and sends the generated operating instruction to the virtual reality device 301.

The virtual reality device 301 receives the operating instruction, and executes a corresponding operation according to the operating instruction.

In some embodiments of the application, the mobile smart terminal 302 comprises a touch screen and an attitude sensor. The mobile smart terminal 302 particularly collects first input information inputted by the user on the touch screen; and/or, by using the attitude sensor, collects second input information inputted by the user by changing a movement attitude of the mobile smart terminal.

When the second input information has been collected, the mobile smart terminal 302 further sends the second input information to the virtual reality device 301, to enable the virtual reality device 301 to execute a corresponding operation according to the second input information.

In some embodiments of the application, the mobile smart terminal 302 particularly collects first input information inputted by the user by clicking a virtual button displayed on the touch screen and/or inputting a hand gesture on the touch screen. The preset instruction database includes: upward, downward, leftward and rightward direction moving instructions; a selection confirmation instruction and a selection cancellation instruction; and a display area zoom in instruction and a display area zoom out instruction.

In some embodiments of the application, the mobile smart terminal 302 particularly collects attitude sensor data to obtain movement data, and calculates according to the movement data to obtain current attitude information of the mobile smart terminal as the second input information.

In order to feed back the touching information on the mobile smart terminal 302 to the user, in some embodiments of the application, the mobile smart terminal 302, by means of the display screen of the virtual reality device 301, displays the thumbnail of the currently displayed input interface on the touch screen and the coordinate information of the touch point inputted by the user on the input interface. Particularly, when it is detected that the user is touching the touch screen, the mobile smart terminal 302 generates a thumbnail of the currently displayed input interface on the touch screen and obtain thumbnail information, acquires coordinate information of a touch point inputted by the user on the touch screen, sends the coordinate information and the thumbnail information to the virtual reality device 301, and enables the virtual reality device 301 to display on a display screen the currently displayed input interface and the touch point corresponding to the thumbnail, to feed back the touching information currently on the mobile smart terminal to the user.

Thus, the method can reduce the probability of occurrence of input errors while ensuring that the eyes of user can stare at the display screen of the virtual reality device, which improves the user experience.

In some other embodiments of the application, the mobile smart terminal 302 conducts a corresponding vibration reminder or sound reminder. Particularly, the mobile smart terminal 302 acquires coordinate information of a touch point inputted by the user on the touch screen, conducts one-by-one matching of the coordinate information of the touch point with preset coordinate information corresponding to the preset instruction in the preset instruction database; when preset coordinate information corresponding to the preset instruction is matched, generates vibration reminder information corresponding to the preset instruction and conducts a vibration reminder; when preset coordinate information corresponding to the preset instruction cannot be matched, does not conduct the vibration reminder or conducts a sound reminder.

Thus, the method can feed back the input operation of the user to the user in time while ensuring that the eyes of user can continuously stare at the display screen of the virtual reality device, which facilitates the user rectifying input errors in time, and improves the user experience.

In conclusion, the input system of the present embodiment collects the input information inputted by the user on the mobile smart terminal by using the mobile smart terminal (for example, a smart phone), for example, collects the input signal on the touch screen of the mobile smart terminal of the user, or, collects the data on the attitude sensor of the mobile smart terminal and so on. Then, the system sends various input signals to the virtual reality device to process, to in turn realize the input on the virtual reality device by using the mobile smart terminal. The application solves the problem that dedicated gamepads have limited input functions, thereby the demands of the user are satisfied without purchasing a separate dedicated gamepad, which saves users money and facilitates popularization and application on a large scale.

The above only describes specific embodiments of the application. By the teaching of the application, a person skilled in the art can make other modifications or variations on the basis of the above embodiments. A person skilled in the art should appreciate that, the above specific description is only for the purpose of better explaining the application, and the protection scope of the application should be subject to the protection scope of the claims.

What is claimed is:

1. An input method, applied to a mobile smart terminal, comprising the steps of:

establishing communication connection with a virtual reality device;

collecting input information of a user on the mobile smart terminal in an input mode; and generating a corresponding operating instruction according to the input information and a corresponding matching relationship between preset instruction and input information in a preset instruction database, and sending the operating instruction to the virtual reality device to enable the virtual reality device to execute a corresponding operation according to the operating instruction, wherein the step of collecting input information of a user on the mobile smart terminal comprises the steps of:

collecting first input information inputted by the user on a touch screen of the mobile smart terminal, wherein when it is detected that the user is touching the touch screen of the mobile smart terminal, generating a thumbnail of a currently displayed input interface on the touch screen and obtain thumbnail information, and acquiring coordinate information of a touch point inputted by the user on the touch screen; and sending the coordinate information and the thumbnail information to the virtual reality device, and causing the virtual reality device to display on a display screen the currently displayed input interface corresponding to the thumbnail information, and display a corresponding touch point on the thumbnail according to the coordinate information, to feed back the touching information currently on the mobile smart terminal to the user.

2. The input method according to claim 1, wherein the step of collecting input information of a user on the mobile smart terminal further comprises the steps of:

collecting second input information inputted by the user by changing a movement attitude of the mobile smart terminal; and when the second input information has been collected, the method further comprises the step of:

sending the second input information to the virtual reality device to enable the virtual reality device to execute a corresponding operation according to the second input information.

3. The input method according to claim 1, wherein the step of collecting first input information inputted by the user on a touch screen of the mobile smart terminal comprises the step of:

collecting first input information inputted by the user by clicking a virtual button displayed on the touch screen and/or inputting a hand gesture on the touch screen;

the preset instruction database includes: upward, downward, leftward and rightward moving instructions; a confirmation instruction and a cancellation instruction; and a display area zoom in instruction and a display area zoom out instruction.

4. The input method according to claim 2, wherein the step of collecting second input information inputted by the user by changing a movement attitude of the mobile smart terminal comprises the steps of:

collecting current movement data of the mobile smart terminal, determining a current movement attitude of the mobile terminal according to the movement data, and using the current movement attitude of the mobile terminal as the second input information.

5. The input method according to claim 2, wherein the step of establishing communication connection with a virtual reality device comprises the steps of:

according to acquired connection state information of the virtual reality device, establishing Bluetooth wireless communication connection or Wi-Fi wireless communication connection with the virtual reality device;

when the collected input information of the user on the mobile smart terminal is the second input information, sending the second input information to the virtual reality device by the Bluetooth wireless communication connection or Wi-Fi wireless communication connection; and when the collected input information of the user on the mobile smart terminal is the first input information, generating a corresponding operating instruction according to the first input information and a corresponding matching relationship between preset instruction and input information in a preset instruction database, and sending the operating instruction to the virtual reality device by the Bluetooth wireless communication connection or Wi-Fi wireless communication connection.

6. An input method, applied to a mobile smart terminal, comprising the steps of:

establishing communication connection with a virtual reality device;

collecting input information of a user on the mobile smart terminal in an input mode; and generating a corresponding operating instruction according to the input information and a corresponding matching relationship between preset instruction and input information in a preset instruction database, and sending the operating instruction to the virtual reality device to enable the virtual reality device to execute a corresponding operation according to the operating instruction, wherein the step of collecting input information of a user on the mobile smart terminal comprises the steps of:

collecting first input information inputted by the user on a touch screen of the mobile smart terminal, wherein when it is detected that the user is touching the touch screen of the mobile smart terminal, acquiring coordinate information of a touch point inputted by the user on the touch screen;

conducting one-by-one matching of the coordinate information of the touch point with preset coordinate information corresponding to the preset instruction in the preset instruction database;

when the coordinate information of the touch point and preset coordinate information corresponding to the preset instruction is matched, generating vibration reminder information corresponding to the preset instruction, and conducting a vibration reminder on the mobile smart terminal, to feed back the touching information currently on the mobile smart terminal to the user; and when the coordinate information of the touch point is matched with none of the preset coordinate information corresponding to the preset instruction in the preset instruction database, not conducting the vibration reminder or conducting a sound reminder on the mobile smart terminal, to feed back the touching information currently on the mobile smart terminal to the user.

7. The input method according to claim 6 wherein the step of collecting input information of a user on the mobile smart terminal comprises the steps of:

collecting second input information inputted by the user by changing a movement attitude of the mobile smart terminal; and when the second input information has been collected, the method further comprises the step of:
sending the second input information to the virtual reality device to enable the virtual reality device to execute a corresponding operation according to the second input information.

8. The input method according to claim 6, wherein the step of collecting first input information inputted by the user on a touch screen of the mobile smart terminal comprises the step of:
collecting first input information inputted by the user by clicking a virtual button displayed on the touch screen and/or inputting a hand gesture on the touch screen; the preset instruction database includes: upward, downward, leftward and rightward moving instructions; a confirmation instruction and a cancellation instruction; and a display area zoom in instruction and a display area zoom out instruction.

9. The input information method according to claim 7, wherein the step of collecting second input information inputted by the user by changing a movement attitude of the mobile smart terminal comprises the steps of:
collecting current movement data of the mobile smart terminal, determining a current movement attitude of the mobile terminal according to the movement data, and using the current movement attitude of the mobile terminal as the second input information.

10. The input method according to claim 7, wherein the step of establishing communication connection with a virtual reality device comprises the steps of:
according to acquired connection state information of the virtual reality device, establishing Bluetooth wireless communication connection or Wi-Fi wireless communication connection with the virtual reality device;
when the collected input information of the user on the mobile smart terminal is the second input information, sending the second input information to the virtual reality device by the Bluetooth wireless communication connection or Wi-Fi wireless communication connection; and
when the collected input information of the user on the mobile smart terminal is the first input information, generating a corresponding operating instruction according to the first input information and a corresponding matching relationship between preset instruction and input information in a preset instruction database, and sending the operating instruction to the virtual reality device by the Bluetooth wireless communication connection or Wi-Fi wireless communication connection.

11. A mobile smart terminal, configured to establish communication connection with a virtual reality device, comprising: a processor, a communication module, and an input collection module, which are connected to the processor, wherein
the input collection module collects input information of a user on the mobile smart terminal and sends it to the processor in an input mode; and
the processor generates a corresponding operating instruction according to the input information and a corresponding matching relationship between preset instruction and input information in a preset instruction database,
wherein the mobile smart terminal sends the operating instruction generated by the processor to the virtual reality device, to enable the virtual reality device to execute a corresponding operation according to the operating instruction,
wherein the input collection module comprises a first input module,
the first input module comprises a touch screen and a first control circuit connected to the touch screen, and the first input module collects first input information inputted by the user on the touch screen,
the first input module further comprises a first feeding back module and a second feeding back module;
the first feeding back module is for, when it is detected that the user is touching the touch screen of the mobile smart terminal, generating a thumbnail of the currently displayed input interface on the touch screen and obtain thumbnail information, acquiring coordinate information of a touch point inputted by the user on the touch screen, sending the coordinate information and the thumbnail information to the virtual reality device, and causing the virtual reality device to display on a display screen the currently displayed input interface and the touch point corresponding to the thumbnail, to feed back the touching information currently on the mobile smart terminal to the user; and
the second feeding back module is for acquiring coordinate information of a touch point inputted by the user on the touch screen; conducting one-by-one matching of the coordinate information of the touch point with preset coordinate information corresponding to the preset instruction in the preset instruction database; when preset coordinate information corresponding to the preset instruction is matched, generating vibration reminder information corresponding to the preset instruction and conducting a vibration reminder on the mobile smart terminal; when preset coordinate information corresponding to the preset instruction cannot be matched, not conducting the vibration reminder or conducting a sound reminder on the mobile smart terminal.

12. The mobile smart terminal according to claim 11, wherein the input collection module comprises a second input module,
the second input module comprises an attitude sensor and a switching circuit connected to the attitude sensor, and the second input module collects a movement attitude of the mobile smart terminal by using the attitude sensor to obtain second input information; and
the mobile smart terminal sends the second input information to the virtual reality device, to enable the virtual reality device to execute a corresponding operation according to the second input information.

13. The mobile smart terminal according to claim 12, wherein the attitude sensor is a nine-axis sensor, and
the nine-axis sensor collects sensor data to obtain movement data, and calculates according to the movement data to obtain current attitude information of the mobile smart terminal as the second input information.

14. The mobile smart terminal according to claim 11, wherein the first input module particularly collects first input information inputted by the user by clicking a virtual button displayed on the touch screen and/or inputting a hand gesture on the touch screen,
the preset instruction database includes: upward, downward, leftward and rightward direction moving instructions; a selection confirmation instruction and a selection cancellation instruction; and a display area zoom in instruction and a display area zoom out instruction.

15. An input system, comprising: a mobile smart terminal, and a virtual reality device which establishes communication connection with the mobile smart terminal, wherein the mobile smart terminal collects input information inputted by a user, according to the input information and a corresponding matching relationship between preset instruction and input information in a preset instruction database, generates a corresponding operating instruction, and sends the generated operating instruction to the virtual reality device; and the virtual reality device receives the operating instruction, and executes a corresponding operation according to the operating instruction, wherein the mobile smart terminal comprises a touch screen, and the mobile smart terminal particularly collects first input information inputted by the user on the touch screen, wherein the mobile smart terminal further, when it is detected that the user is touching the touch screen, generates a thumbnail of the currently displayed input interface on the touch screen and obtain thumbnail information, acquires a coordinate information of a touch point inputted by the user on the touch screen, sends the coordinate information and the thumbnail information to the virtual reality device, and enables the virtual reality device to display on a display screen the currently displayed input interface and the touch point corresponding to the thumbnail, to feed back the touching information currently on the mobile smart terminal to the user;

and/or, acquires coordinate information of a touch point inputted by the user on the touch screen, conducts one-by-one matching of the coordinate information of the touch point with preset coordinate information corresponding to the preset instruction in the preset instruction database; when preset coordinate information corresponding to the preset instruction is matched, generates vibration reminder information corresponding to the preset instruction and conducts a vibration reminder; when preset coordinate information corresponding to the preset instruction cannot be matched, does not conduct the vibration reminder or conducts a sound reminder.

16. The input system according to claim 15, wherein the mobile smart terminal comprises an attitude sensor, the mobile smart terminal particularly collects second input information inputted by the user by changing a movement attitude of the mobile smart terminal by using the attitude sensor; and when the second input information has been collected, the mobile smart terminal further sends the second input information to the virtual reality device, to enable the virtual reality device to execute a corresponding operation according to the second input information.

17. The input system according to claim 16, wherein the mobile smart terminal particularly collects first input information inputted by the user by clicking a virtual button displayed on the touch screen and/or inputting a hand gesture on the touch screen; the preset instruction database includes: upward, downward, leftward and rightward direction moving instructions; a selection confirmation instruction and a selection cancellation instruction; and a display area zoom in instruction and a display area zoom out instruction;

and/or, collects attitude sensor data to obtain movement data, and calculates according to the movement data to obtain current attitude information of the mobile smart terminal as the second input information.

* * * * *